США Patent [19] [11] 4,118,221
Ettel et al. [45] Oct. 3, 1978

[54] COPPER RECOVERY FROM SULFATE SOLUTIONS CONTAINING NICKEL AND COBALT

[75] Inventors: Victor Alexander Ettel; Eric August Pierre Devuyst, both of Mississauga, Canada

[73] Assignee: The International Nickel Company, Inc., New York, N.Y.

[21] Appl. No.: 849,074

[22] Filed: Oct. 7, 1977

[30] Foreign Application Priority Data

Feb. 28, 1977 [CA] Canada ................................. 272785

[51] Int. Cl.$^2$ ..................... C22B 15/12; C22B 23/04
[52] U.S. Cl. ........................................ 75/108; 75/117; 75/119; 423/35; 423/145
[58] Field of Search ................. 75/0.5 A, 108, 117, 75/119; 423/145, 35

[56] References Cited

U.S. PATENT DOCUMENTS

| | | | |
|---|---|---|---|
| 1,278,854 | 9/1918 | Christensen | 75/117 X |
| 3,573,896 | 4/1971 | Hori | 75/117 |
| 3,684,489 | 8/1972 | Emicke et al. | 423/36 X |
| 3,744,994 | 7/1973 | Emicke et al. | 75/119 X |
| 4,067,952 | 1/1978 | Pittie et al. | 423/45 X |

*Primary Examiner*—G. Ozaki
*Attorney, Agent, or Firm*—Lewis Messulam; Ewan C. MacQueen

[57] ABSTRACT

Copper is separated from nickel present therewith in a sulfate solution by neutralizing to precipitate all the copper and some nickel as basic compounds, and thereafter reducing the copper in the basic compounds to elemental form through formation of cuprous sulfite and thermal dissociation of the latter.

6 Claims, No Drawings

COPPER RECOVERY FROM SULFATE SOLUTIONS CONTAINING NICKEL AND COBALT

The present invention relates to the recovery of copper and nickel, and in particular to the separate recovery of these metals from sulfate solutions containing both of them.

In the hydrometallurgical recovery of copper and/or nickel from their ores, solutions are typically generated which contain both of the metals in the form of dissolved sulfates. Such solutions might, for example, result from a pressure leach of sulfide ores, or a sulfuric acid leach of oxide ores of the metals. In order to produce pure nickel from such solutions by electrolytic means, it is necessary first to remove all of the copper therefrom.

Various means can be suggested for achieving this copper removal, including: cementation, electrolysis, solvent extraction and precipitation. None of these however provides an entirely satisfactory solution to the problem from an economic viewpoint. Thus cementation with nickel metal involves dissolution of large amounts of nickel, where the copper content is substantial, and the subsequent recovery of dissolved nickel electrolytically adds to the energy costs of the process. Electrolytic removal of the copper is of course an expensive procedure and in any case can be used to recover a large part, but not all, of the copper, so that an additional step such as cementation or solvent extraction would still be needed to provide a copper-free solution. Moreover the cost of electrolysis may not be warranted where less than high purity copper is desired. Solvent extraction necessarily involves the use of expensive reagents, while even precipitation cannot be practised with low costs reagents if efficient separation is desired whereby all the copper is to be precipitated without precipitating any substantial amount of nickel. Thus hydroxide precipitation with the aid of ammonia, which would keep nickel in solution as a complex, suffers from the drawback that ammonia is both more expensive, and more objectionable environmentally, than lime or limestone; however using a base such as lime it would be impossible to precipitate all of the copper without forming substantial amounts of nickel hydroxide precipitate.

It is an object of the present invention to provide an improved process whereby copper and nickel can be recovered separately from sulfate solutions containing them.

It is a further object to provide such a process which involves the use of inexpensive reagents.

According to the invention a method of recovering copper and nickel separately from an acidic sulfate solution containing both of these metals comprises the following steps:

I. Treating the solution with a base selected grom the group consisting of hydroxides and carbonates of alkali and alkaline earth metals to precipitate substantially all of the copper present and some of the nickel as basic compounds thereof;
II. separating the basic compounds obtained in Step I from the essentially copper-free nickel liquor;
III. reducing the copper present in the basic compounds to elemental copper through formation of cuprous sulfite and thermal dissociation thereof under pressure;
IV. separating the elemental copper produced in Step III from the solution;
V. recycling the spent solution obtained in Step IV to perform Step I thereon; and
VI. recovering nickel from the essentially copper-free nickel liquor obtained in Step II.

The term "basic compounds" is used herein to described the hydroxidic precipitates obtained on neutralization, which may consist in part of hydroxides and in part of basic sulfates. For the sake of simplicity, the chemistry of the process is described herein by treating these compounds as hydroxides of nickel and copper.

In carrying out the first step of the process, i.e. the precipitation of copper and nickel hydroxides, it will generally be desirable, for economic as well as environmental reasons, to use lime or limestone as base. As a result, the precipitation of copper and nickel hydroxides will of course be accompanied by the precipitation of calcium sulfate. The transporting of this gypsum with the metal hydroxides to be treated in subsequent steps of the process not only complicates the material handling requirements, but even more importantly, limits the effective capacity of the equipment such as the autoclave referred to below. For this reason it is a preferred feature of the process of the invention to separate the gypsum in such a case from the metal hydroxides. This is achieved by controlling precipitation conditions to ensure that the gypsum formed is of a much larger particle size than the metal hydroxides, in the manner which is described more fully in copending application for Canadian Letters Patent, Ser. No. 233,650, filed Apr. 2, 1975 and assigned in common with the present invention. The large gypsum crystals are then separated from the finer metal hydroxides by means such as screening or elutriation.

After removal of the hydroxides and gypsum from the neutralized solution, the remaining clear liquor being essentially copper-free can be used for recovery of a high purity nickel product, for example by electrowinning, in a known manner.

The next stage in the process of the invention involves the reduction of most of the copper present in the mixture of copper and nickel hydroxides to elemental form. This is achieved by forming an aqueous slurry of the hydroxide mixture, reacting the slurry with a sulfiting agent so as to transform most of the copper hydroxide into copper sulfite. The latter may consist of the mixture of monovalent and divalent sulfites of copper, $CuSO_3 \cdot Cu_2SO_3 \cdot 2H_2O$, known as "Chevreuil Salt", but preferably the sulfiting is conducted in such a way that most of the copper is present in monovalent form, $Cu_2SO_3 \cdot H_2O$. The sulfiting is achieved by contacting the slurry with sulfurous acid or with the sulfite salt of an alkali or alkaline earth metal, the pH being controlled if necessary in either case with the aid of an alkali or alkaline earth metal base. By carrying out this reaction in a sealed vessel maintained at a temperature of at least about 150° C., elemental copper is produced by the thermal dissociation of the copper sulfite formed in situ, as described in more detail in British Pat. No. 1,196,507. Alternatively the sulfiting can be carried out first, and the slurry subsequently transferred to the autoclave and heat treated therein under pressure at, for example, 150°–170° C.

Where sulfurous acid is to be relied on as the sulfiting agent, the procedure may involve bubbling pure sulfur dioxide into the hydroxide slurry, or a mixture of sulfur dioxide and an inert gas can be used. However the presence of air or oxygen in the gas mixture used is to be avoided since under the catalytic influence of copper hydroxide, oxygen would tend to oxidize the sulfur dioxide present to sulfuric acid.

As will be clear from our reference to the above-mentioned British Patent, the conversion of copper compounds to elemental copper via copper sulfite as an intermediate is not new in itself. However to the best of our knowledge its potential as an important part of an economical commercial process for effecting nickel-copper separation has not hitherto been appreciated or advocated.

During both the sulfiting reaction, and the thermal dissociation in the autoclave, sulfuric acid is generated as a by-product, and it is for this reason that it is essential to add an appropriate amount of base to the hydroxide slurry prior to, or during, the sulfiting reaction. Thus in the course of the transformation of 1 mole of copper in solution to copper hydroxide and thence to elemental copper a theoretical total of two moles of calcium base (i.e. 4 base equivalents) would be needed to ensure a neutral final slurry. In practice somewhat less base is needed since at least some of the metal precipitates as basic sulfate rather than hydroxide. Moreover since some degree of acidity is needed to ensure that reduction proceeds in the autoclave the total amount of base must be somewhat less than that theoretical maximum. For that reason no more than about 3.8 base equivalents per mole of copper should be used in the overall conversion of copper ions to elemental copper. Of course if the total amount of base equivalents per mole of copper is too low, the resulting free acid in the autoclave liquor leads to a low recovery of elemental copper. Moreover we have found that the ratio of base equivalents per copper mole influences the particle size of the elemental copper product so that too low or too high a ratio results in a finer product, less readily separated from any gypsum mixed therewith. In view of this a minimum ratio of about 2.8 base equivalents per copper mole should be used, and therefore the ratio should be within the range of about 2.8 to 3.8 base equivalents per mole of copper.

The total base equivalents used in the process may be made up of, for example, calcium hydroxide or carbonate added directly to the copper starting solution, added directly to the copper hydroxide slurry, or added indirectly to that slurry as calcium sulfite. Where sulfurous acid is used for the sulfiting, the total base equivalents comprise base directly added during the precipitation and during the sulfiting. If all of the needed base is added during the precipitation stage a sufficient amount of nickel hydroxide is formed to act as the neutralizing agent during sulfiting. This is a preferred procedure when a calcium base is used, since it enables efficient usage of the autoclave by carrying out elutriation to remove most of the gypsum from the slurry to be fed into the autoclave. It is therefore a preferred feature of the invention to add 2.8 to 3.8 base equivalents of calcium base to the initial copper solution so that no further base addition is required thereafter.

The slurry extracted from the autoclave at the end of the dissociation process contains most of the copper in elemental form so that the remaining liquid is essentially a nickel sulfate solution, which will typically contain not more than about 5% of the total amount of copper initially present. (Unless otherwise indicated, all percentages referred to in the present specification are percentages by weight.) Thus after elutriation to recover separately the elemental copper and any gypsum present, the nickel solution which we refer to for simplicity as "spent solution" can be recycled by mixing it with a fresh supply of copper- and nickel-containing solution to be treated in accordance with the invention.

By way of explanation, we offer the following description of the reactions which are believed to take place when a sulfate solution is treated in accordance with a preferred embodiment of the invention.

The sulfate solution is first contacted with sufficient limestone to precipitate copper and some nickel according to the reactions:

$$CuSO_4 + CaCO_3 + H_2O \rightarrow Cu(OH)_2 + CaSO_4 + CO_2.$$

$$NiSO_4 + CaCO_3 + H_2O \rightarrow Ni(OH)_2 + CaSO_4 + CO_2.$$

The copper hydroxide is then converted to sulfite by means of sparging with sulfur dioxide according to the reaction:

$$2Cu(OH)_2 + (2+x)SO_2 + xCaCO_3 \rightarrow Cu_2SO_3.H_2O + H_2SO_4 + xCO_2 + xCaSO_3$$

where $x$ can vary between 0 and 1 depending on the amount of limestone added for pH control.

The copper sulfite is then dissociated, by heating it to above 150° C., according to the reaction:

$$Cu_2SO_3.H_2O \rightarrow 2Cu° + H_2SO_4.$$

The utility of the present invention is by no means restricted to the treatment of solutions which contain only nickel and copper. In particular cobalt is often associated with nickel and may be present in the solution to be treated, in which case it behaves in the same way as nickel in that it is precipitated, at least in part, as a hydroxidic precipitate when the solution is neutralized, and the precipitate acts as a base during the subsequent reduction of copper to its elemental form. It will therefore be understood that reference herein to separating copper and nickel from one another includes the case where cobalt is also present in the sulfate solution from which copper is to be recovered separately. (The separation of cobalt and nickel from one another does not form part of the present invention and is not described herein).

Some examples of the process will now be described.

EXAMPLES 1–4

A sulfate solution containing 16 grams per liter (g/l) of copper and 5 g/l of nickel, and having a pH of about 3.5 was treated with an aqueous slurry of lime which was added in small increments until the total amount added corresponded to 2 base equivalents per mole of copper. This was found to result in precipitation of substantially all of the copper from the solution, together with about a quarter of the nickel originally present in the solution.

By filtration of the resulting slurry, a clear liquor was obtained which contained about 3 g/l of nickel with less that 0.001 g/l of copper.

The solids obtained from the above filtration process, comprising the basic precipitates of copper and nickel as well as gypsum, were re-slurried with water, the resulting slurry containing 63.4 g/l of copper and about 5.5 g/l of nickel as well as about 40 g/l of calcium. Samples of such a slurry were used for carrying out a series of sulfiting/decomposition tests (Examples 1 to 4).

In the case of Example 1 the copper hydroxide/nickel hydroxide/gypsum slurry was used without addition of further base. It was merely heated to 50° C. and sparged for 3 hours by bubbling a gaseous mixture of 1 part by volume of sulfur dioxide with 3 parts by volume of nitrogen at a rate of 1.2 liters of mixture per minute. At the end of this time the pH had been lowered to about 1.7. The resulting slurry of cuprous sulfite/nickel sulfate/calcium sulfite/gypsum was transferred to an autoclave where it was heated under pressure for 1 hour at 150°–167° C. By solid/liquid separation, followed by elutriation of the solids, the resulting copper concentrate was separated from gypsum and the spent solution.

Each of the Examples 2–4 was carried out in essentially the same manner as Example 1 except that various amounts of lime were added to the copper hydroxide/nickel hydroxide/gypsum slurry prior to the sulfiting operation. Table 1 below shows the composition of the slurry before introduction of the sulfur dioxide-containing gas in each of the four tests. The last column in the table represents the ratio of the total base equivalents to moles of copper in the slurry. In the case of Example 1 the ratio represents the base (1 mole of calcium hydroxide per mole of copper) which was used for precipitation, while in the other examples the ratio is based on the lime used for precipitation as well as that which was added to the slurry.

TABLE 1

| Ex. | g/l of Cu | g/l of Ni* | g/l of Ca(OH)$_2$ added to slurry | Total base equivalents / Moles of Copper |
|---|---|---|---|---|
| 1 | 63.4 | 5.5 | 0 | 2.0 |
| 2 | 63.4 | 5.5 | 14.8 | 2.4 |
| 3 | 63.4 | 5.5 | 29.6 | 2.8 |
| 4 | 63.4 | 5.5 | 44.4 | 3.2 |

*The value given for the nickel content is only an approximate one.

The results of sulfiting and thermal dissociation may be seen from the compositions of the spent solution and solids obtained from the autoclave, which compositions are given in Table 2 below:

TABLE 2

| | Spent Solution | | Elutriated Solids | | Recovery (% of Cu initially present) | |
|---|---|---|---|---|---|---|
| Example | Cu(g/l) | Ni(g/l) | % Cu in Cu Product | % Cu in Gypsum | in Cu Product | as Cu Metal in Cu Product |
| 1 | 11.6 | 5.08 | 90.0 | 1.42 | 77.8 | 58.0 |
| 2 | 9.2 | 5.59 | 90.5 | 0.34 | 84.8 | 76.7 |
| 3 | 5.1 | 5.78 | 94.5 | 0.20 | 91.5 | 87.1 |
| 4 | 3.3 | 5.50 | 96.0 | 0.78 | 93.0 | 93.0 |

Examination of Table 2 shows that in Examples 1 and 2, the copper product produced by elutriation of the autoclave solids was only of 90% purity, i.e. it contained a significant amount of undissociated $Cu_2SO_3 \cdot H_2O$. Moreover the amounts of copper recovered in elemental form were only 58% and 76.7% respectively.

At the other end of the scale, the results obtained in Example 4 show that 93% of all the copper initially present was recovered in the copper product and substantially the whole of that was in elemental form. While the results given in Table 2 show the effect of the amount of base used on copper recovery in elemental form, they also illustrate to some extent its effect on the particle size of the product. Thus the amount of Cu 'lost' in the gypsum can be seen to decrease and then increase slowly with base addition, reflecting the variation in copper particle size. The variation can be seen more clearly from the size distribution of copper particles given in Table 3 below. The mesh sizes referred to are Tyler Screen sizes.

TABLE 3

| | wt % of Cu product constituting size fraction | | | |
|---|---|---|---|---|
| Example | + 35 mesh | − 35 mesh + 65 mesh | − 65 mesh + 150 mesh | − 150 mesh |
| 1 | 2.3 | 74.0 | 20.8 | 2.9 |
| 2 | 3.2 | 84.0 | 12.0 | 0.8 |
| 3 | 1.4 | 50.5 | 38.8 | 9.3 |
| 4 | 0 | 7.2 | 57.4 | 35.4 |

EXAMPLE 5

A sulfate liquor containing 13.8 g/l of copper, 79.5 g/l of nickel and 10.5 g/l of cobalt was neutralized in a continuous manner using commercial lime, which contains some magnesium. The neutralization was carried out at 80°–85° C. using a lime addition of about 3 base equivalents per mole of copper. The resulting slurry was screened using a 325 mesh sieve to separate a coarse solids fraction consisting predominantly of gypsum from finer solids consisting predominantly of hydroxides of copper, nickel and cobalt. The results of the precipitation are given in Table 4.

The separated fine solids were repulped with 1 liter of water and the resulting slurry, containing about 58.9 g/l of copper, 91.8 g/l of nickel, 10.5 g/l of cobalt and 2.2 g/l of calcium, was transferred to an all-titanium autoclave. There sulfur dioxide at a pressure of 0.2 MPa was introduced into the slurry for 20 minutes during which time the temperature was observed to rise to about 45° C. as a result of the exothermic nature of the sulfiting reaction. At the end of that time the sulfur dioxide flow was discontinued, the slurry was heated to 150° C. and maintained at 150°–160° C. under the corresponding natural pressure for a period of 1 hour. The autoclave discharge was filtered and the copper concentrate was washed and dried. Assays of the streams fed into and obtained from the autoclave are shown in Table 5.

TABLE 4

| STREAM | Weight or Volume | (g)(l) | ASSAYS Cu | Ni | Co | Ca | Distribution (%) Cu | Ni | Co | Ca |
|---|---|---|---|---|---|---|---|---|---|---|
| Feed Liquor | 6.16 | (l) | 13.8* | 79.5* | 10.5* | — | 100 | 100 | 100 | — |
| Lime | 148 | (g) | — | — | — | 34 | — | — | — | 100 |
| Copper-depleted Liquor | ~6.16 | (l) | 0.028* | 61.3* | 8.47* | 0.50* | 0.2 | 77.2 | 80.6 | 6.1 |
| − 325 Solids Fraction | 486 | (g) | 12.3 | 18.9 | 2.17 | 0.45 | 68.9 | 18.8 | 16.5 | 4.4 |
| + 325 Solids Fraction | 391 | (g) | 6.45 | 5.10 | 0.50 | 11.5 | 29.1 | 4.1 | 3.1 | 89.9 |

*Marked assays are in g/l, other assays are in wt %.

TABLE 5

| STREAM | Weight or Volume | (g)(l) | ASSAYS Cu | Ni | Co | Ca | Distribution (%) Cu | Ni | Co | Ca |
|---|---|---|---|---|---|---|---|---|---|---|
| Feed Solids | 486 | (g) | 12.3 | 18.9 | 2.17 | 0.45 | 100 | 100 | 100 | 100 |
| Final Liquor | 1.025 | (l) | 1.43* | 82.0* | 9.40* | 0.50* | 2.5 | 91.5 | 91.8 | 23.5 |
| Copper Solids | 68.3 | (g) | 84.5 | 0.10 | 0.17 | 2.34 | 96.5 | 0.1 | 1.1 | 73.3 |
| Washings | 0.645 | (l) | 0.90* | 2.36* | 0.26* | — | 1.0 | 1.7 | 1.6 | — |

*Marked assays are in g/l, other assays are in wt %.

The results of the last-mentioned example, which was not carried out under optimized conditions, are given to demonstrate the applicability of the invention to cobalt-containing solutions, as well as to illustrate the procedure whereby maximum usage of the autoclave is made by adding all the necessary lime in the precipitation stage and elutriating away most of the gypsum.

While the invention has been described with reference to preferred embodiments thereof, various modifications may be made to such embodiments without departing from the scope of the invention which is defined by the appended claims.

We claim:

1. A method of recovering copper and nickel separately from an acidic sulfate solution thereof comprising the following steps:

I. Treating the solution with a base selected from the group consisting of hydroxides and carbonates of alkali and alkaline earth metals to precipitate substantially all of the copper present and some of the nickel as basic compounds thereof;

II. separating said basic compounds obtained in Step I from an essentially copper-free nickel liquor;

III. reducing the copper present in said basic compounds to elemental copper through formation of cuprous sulfite and thermal dissociation thereof under pressure;

IV. separating said elemental copper produced in Step III from spent solution;

V. recycling said spent solution obtained in Step IV to perform Step I thereon; and VI. recovering nickel from said essentially copper-free nickel liquor obtained in Step II.

2. A method as claimed in claim 1 wherein the base used in said Step 1 comprises a calcium base whereby gypsum is precipitated with said basic compounds, and wherein said Step II comprises carrying out a three-phase separation of said basic compounds from said gypsum and said liquor.

3. A method as claimed in claim 2 wherein said calcium base is added in an amount corresponding to between about 2.8 and 3.8 base equivalents per mole of copper.

4. A method as claimed in claim 3 wherein said formation of cuprous sulfite in said Step III is effected by forming an aqueous slurry of said basic compounds and treating said slurry with sulfurous acid.

5. A method as claimed in claim 1 wherein said thermal dissociation of said Step III is effected by heating said cuprous sulfite in a sealed pressure vessel maintained at a temperature of at least about 150° C.

6. A method as claimed in claim 5 wherein said formation of said cuprous sulfite is effected in situ in said pressure vessel.

* * * * *